J. KRUSE.
METHOD OF RENDERING WOOD INSECT REPELLENT.
APPLICATION FILED AUG. 11, 1917.
1,312,634. Patented Aug. 12, 1919.
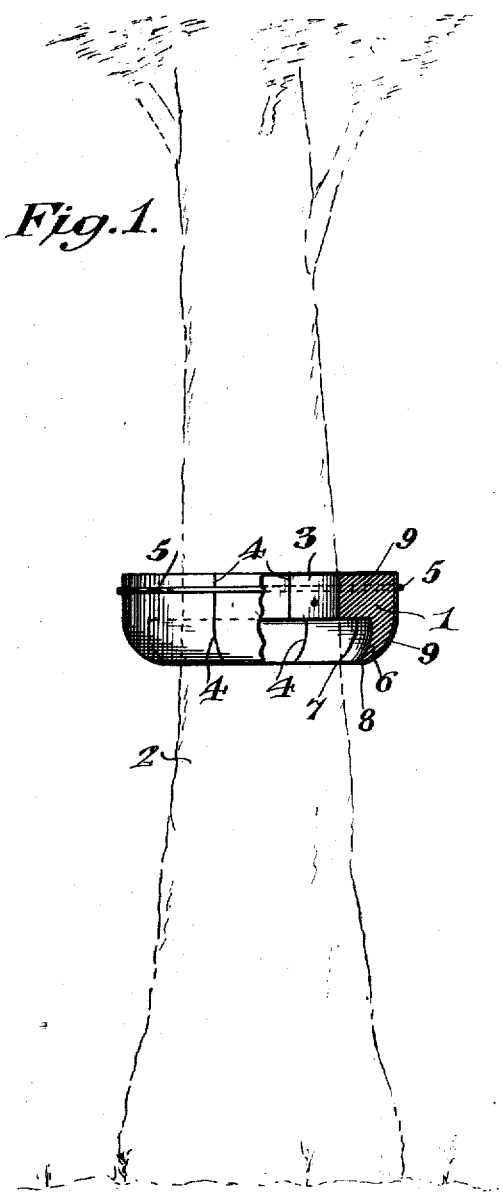
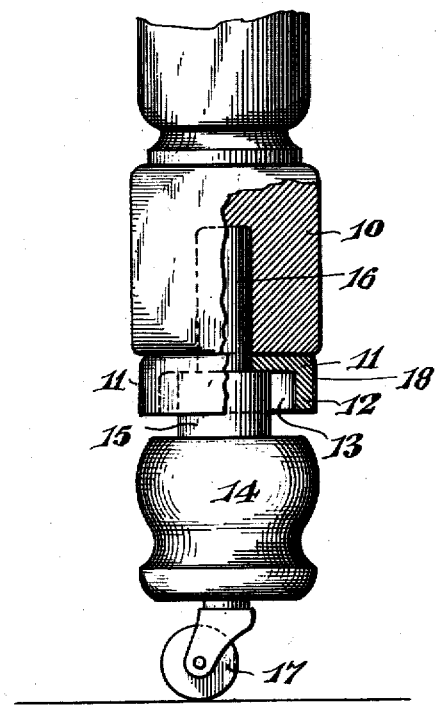
John Kruse, INVENTOR

UNITED STATES PATENT OFFICE.

JOHN KRUSE, OF NEW ORLEANS, LOUISIANA.

METHOD OF RENDERING WOOD INSECT-REPELLENT.

1,312,634.   Specification of Letters Patent.   Patented Aug. 12, 1919.

Application filed August 11, 1917. Serial No. 185,763.

*To all whom it may concern:*

Be it known that I, JOHN KRUSE, a citizen of the United States, residing at New Orleans, in the parish of Orleans and State of Louisiana, have invented a new and useful Method of Rendering Wood Insect-Repellent, of which the following is a specification.

This invention has reference to a method of rendering wood insect-repellent, and its object is to prepare wood in such a manner that it may be used for many purposes, including the protection of furniture and the like, against the incursions of ants and other roaming insects.

By the present invention, unsightly appendages to furniture are avoided, the use of liquid eliminated, and the protection afforded may be applied in a manner to have an ornamental appearance, without in any way weakening the structure to which the invention is applied.

The invention consists in impregnating wood with a substance not only repellent, but destructive to insects such as ants, bed bugs and other roaming insects sometimes infesting households and finding their way up the legs of household furniture to the annoyance of persons living in the house, and frequently contaminating food, especially such as may be left upon tables or stored in ice-boxes or other storage places.

The invention will be best understood from a consideration of the accompanying drawings forming part of this specification, with the understanding, however, that the articles shown in the drawings constitute but a small fraction of the many articles to which the invention is applicable and therefore the practical application of the invention is not in any manner confined to the protection of the two articles shown in the drawings.

In the drawings:

Figure 1 is an elevation, partly in section, of a tree protector prepared in accordance with the invention, the tree being indicated in dotted lines with the proportions of the protector for the tree greatly exaggerated;

Fig. 2, is an elevation, partly in section, of the lower end of a leg of a piece of furniture, illustrating another application of the invention.

In practising the invention, there is prepared an impregnating bath of water, bichlorid of mercury (commonly known as corrosive sublimate), and hydrochloric acid. These ingredients may be in the proportions of one pound of water (rain water preferred) one ounce of corrosive sublimate and one ounce of hydrochloric acid, preferably the chemically pure acid.

The wood, preferably elm wood, is suitably shaped and is kiln-dried for fifteen to twenty minutes, depending upon conditions present, and when taken out of the dry-kiln is immediately submerged in the impregnating solution and kept there until it is thoroughly saturated, this being indicated by the fact that the wood then sinks. Finally, the wood is taken from the impregnating bath and allowed to dry naturally when it is ready for any purpose for which it is adapted. The bichlorid of mercury is not only highly poisonous to the insects but its corrosive qualities make it highly repellent to the insects. The purpose of the hydrochloric acid is to open up the pores of the wood to a greater extent than this is done by heat alone, so that the impregnation of the wood is more thorough and the quantity absorbed by the wood and also presented on the surface of the wood is greater than would occur were the hydrochloric acid absent. The hydrochloric acid serves to an extent as a carrier or vehicle for the bichlorid of mercury. Since the wood is thoroughly saturated, it may be shaped after impregnation, but generally it is preferable to shape the wood before impregnation to save handling materials which are highly detrimental to human beings.

The impregnated wood is particularly adapted for the manufacture of specially designed wooden blocks which may be produced either before or after impregnation. These blocks which are shown, described and claimed in another application filed by me on even date herewith for insect-proof attachments for furniture and other articles, are so arranged that the insect, in traveling over the furniture, must traverse and come in contact with the surface of the impregnated wood.

Examples of these blocks are given in Figs. 1 and 2. In Fig. 1, there is shown a ring-shaped block 1, which may be considered as made of the impregnated wood, this block being shaped to encircle a tree indicated in dotted lines at 2. The block is provided with a central opening 3, whereby it may be made to encircle a tree and is cut as shown at 4 to permit its application to a tree. A ring or hoop 5 serves to bind the block upon a tree after application thereto. The block is provided on one side with a depending flange or apron 6, preferably inturned toward the tree, but sufficiently spaced from the opening 3 to make it necessary for an ant or other like insect crawling up the tree and reaching the block to crawl along an inner surface 7 constituting the bottom of the body of the block and then along an inner wall 8 of the depending flange 6 before it can reach the outer surface of the block, which latter is protected by a coating 9 of varnish or paint or other suitable material which will prevent actual contact with the impregnated wood. This last feature of the coating 9 is designed to protect human beings or animals which it is not designed to harm from contact with the corrosive and highly poisonous material with which the block is impregnated.

The insects, however, must necessarily come in contact with the poisoned surface where unprotected by the coating 9, and consequently, the insects are either repelled or are killed and so are prevented from reaching a higher point than the location of the block.

In Fig. 2 there is shown a table or similar leg 10 to which there is applied a ring-shaped block 11 with an annular flange 12 projecting from one face and providing a recess 13. Another block 14 having a body portion which may be of ornamental configuration, and an axial boss 15 terminating in a stem continuation 16 has the boss 15 lodged in the chamber 13 concentric with the flange, 12, while the continuation 16 projects through a central aperture in the block 11 and into the leg 10 where it may be fastened in any suitable way, thus clamping the block 11 to the bottom of the leg 10 and above the block 14, the latter serving as a receiving means for a caster 17 or other appropriate support. The block 11 is provided with a protecting coating 18 of varnish or paint or the like similar to the coating 9 of Fig. 1 and for the same purpose.

In the showing of Fig. 2, an ant or other insect must travel up the block 14, along the boss 15, and thence along the inner surface of the chamber 13 before it can reach the outer face of the block 11, but during this course of travel, the insect comes in contact with an exposed poisoned surface repellent or fatal to the insect.

The protecting coating 9 or 18, as the case may be, acts as a safeguard when dusting or sweeping or scrubbing, and prevents danger of contact as before stated especially by playing children, pet animals, etc.

The blocks may be so made that they become practically integral parts of the piece of furniture or article to which they are attached and cannot be disturbed by outside influences, and furthermore, are absolutely harmless except with respect to ants or other roving insects. Moreover, they are more effective and avoid the use of unsightly oil cans, saucers, ant tape and other devices which have been proposed and which need frequent attention. The impregnated blocks last for years and are entirely unnoticeable when applied.

Besides the two examples given in the drawings whereby a tree or a piece of furniture such as a table is protected, blocks made in acordance with the invention may be used to protect ice-boxes, bedsteads and various other articles which it is desired should be protected from ants and other small roving insects.

When the device is applied to a tree or other object where the surface is uneven, like the bark of the tree, for instance the depressions in the bark where the device is applied are filled with pitch or tar or other suitable substance, so as to prevent ants or other insects crawling up the tree by any path except one which will bring them to the repellent material.

What is claimed is:—

1. The method of preparing wood for use as a protection against the incursion of ants and other insects, which consists in impregnating the wood with a solution in water of bichlorid of mercury and hydrochloric acid, with the acid in sufficient quantity to open the pores of the wood to an extent to facilitate the entrance of the bichlorid of mercury into the wood, and subsequently drying the wood.

2. The method of preparing wood for use as a protection against the incursion of ants, which consists in first kiln-drying the wood, then immersing the wood in an aqueous solution of corrosive sublimate and hydrochloric acid until the wood sinks, the acid being in sufficient quantity to open the pores of the dried wood and the bichlorid of mercury being in sufficient quantity to be insect-repellent and serve as an insecticide, and then removing the saturated wood and allowing it to spontaneously dry.

3. The method of preparing wood for use as a protection against the incursion of ants, which consists in kiln-drying the wood, submerging it while hot in an aqueous solution of corrosive sublimate and hydrochloric acid in substantially the proportion of one pound of water, one ounce of corrosive sublimate and one ounce of hydrochloric acid, with the wood remaining in the solution until it is impregnated to an extent causing it to sink and then removing the wood from the impregnating bath and allowing it to dry spontaneously.

In testimony that I claim the foregoing as my own, I have hereto affixed my signature in the presence of two witnesses.

JOHN KRUSE.

Witnesses:
   FRANCIS J. WOHLLEHEN,
   RAYMOND F. SCHNEPP.